US006728664B1

(12) United States Patent
Fouad

(10) Patent No.: US 6,728,664 B1
(45) Date of Patent: Apr. 27, 2004

(54) SYNTHESIS OF SONIC ENVIRONMENTS

(76) Inventor: Hesham Fouad, 1711 N. Highland St., Arlington, VA (US) 22201

(*) Notice: Subject to any disclaimer, the term of this patent is extended or adjusted under 35 U.S.C. 154(b) by 0 days.

(21) Appl. No.: 09/469,301

(22) Filed: Dec. 22, 1999

(51) Int. Cl.[7] .......................... G06F 17/10; G06F 7/60; G06G 7/48; G06G 7/58

(52) U.S. Cl. .................................. 703/2; 703/2; 703/11

(58) Field of Search ......................... 703/11, 2; 381/18; 340/384.72, 384.3, 384.5, 384.71

(56) References Cited

U.S. PATENT DOCUMENTS 5,293,385 A * 3/1994 Hary ........................... 714/38
5,590,207 A * 12/1996 Taylor ........................ 381/332
5,621,877 A * 4/1997 Neumann et al. ........... 345/723
5,633,993 A 5/1997 Redmann et al.
5,649,066 A * 7/1997 Lacher et al. ................. 706/25
5,784,467 A * 7/1998 Asayama ..................... 381/17
5,835,604 A * 11/1998 Lee ............................. 380/51
5,990,888 A 11/1999 Blades et al.
6,088,687 A * 7/2000 Leleu ......................... 705/400

* cited by examiner

*Primary Examiner*—Kevin J. Teska
*Assistant Examiner*—Dwin M. Craig
(74) *Attorney, Agent, or Firm*—Patent & Trade Mark Services, Inc; Joseph H. McGlynn

(57) ABSTRACT

A SoundNet is a process for synthesizing sonic environments for use in Virtual Environment applications, computer games, Internet web pages, film and television productions. A sonic environment is a collection of spatially located sounds describing some scenario such as a city street for example. SoundNet provides a process for generating such an environment that has the following properties: a compact representation, stochastically correct behavior, dynamically varying behavior along application defined parameters, temporally unbounded and non-repeating, and facilitates automatic generation of the representation.

12 Claims, 15 Drawing Sheets

SYNTHESIS OF SONIC ENVIRONMENTS

FIELD OF THE INVENTION

The present invention relates to computer sound. More specifically to a sonic environment. Still more particularly to a sonic environment having behavioral modification.

BACKGROUND OF THE INVENTION

In the past, the main focus in computer sound has been on computer music and sound synthesis. Both are interesting problems, but there is an unfulfilled need for tools to create whole sonic environments. A sonic environment is a collection of spatially located sounds describing some scenario. For example, while a sonic forest environment may include a bird, wind, water, animal and human sounds it is very difficult, using current tools, to create such an environment because there is no easy way to orchestrate the sounds.

There are two ways to create such a sonic environment, the first is to obtain an actual recording of a forest and play it back. Unfortunately this technique is very storage intensive, a two-minute digital recording at CD quality will require 20 Mbytes of storage. It is also very difficult to make any changes to the sounds once they are recorded and it is impossible to modify the behavior of the sounds dynamically during playback because the representation is not parameterized. Finally, a digital recording is temporally bounded while the application may not be. When an application is temporally bounded it lasts for a finite amount of time. For example, a walk through of the virtual environment will last as long as the user wishes and the application may run out of recorded material yielding no sound. The solution to this would be to loop the recording so that when it ends, playing back again from the beginning. However this solution is noticeable and the environment does not seem realistic.

The second way to create a sonic environment is to use a scripting technique such as a MIDI sequencer to initiate the playing of individual recordings of each of the sound elements comprising the environment, such as a bird call, wind blowing etc. This solves some of the problems mentioned earlier because such a representation is not storage intensive, and a MIDI script can be modified. Other problems, however, persist. While it may be possible to dynamically modify the playback behavior using MIDI control messages such as pitch bend and modulation, this mechanism is intended for musical performance and does not provide the capability to dynamically change the behavior of the environment in a meaningful way. A MIDI script is temporally bounded so that the script may run out before the application is done. Creating the script in the first place is a very tedious task.

Existing techniques include digital recordings and scripting techniques such as MIDI sequences. A digital recording of a sonic environment can be made and played back by the application. Such a representation only exhibits a compact representation. Scripting techniques may be used to orchestrate the playback of the sounds comprising a sonic environment. Scripting techniques do not however exhibit compact representations, stochastically correct behavior, nor dynamically varying behavior. Scripting techniques only provide a limited facility for generation of the representation.

The inherent draw back of current representations is that they are literal: the representation is a specification for a single behavior of the sonic environment over a limited period of time. For example we can model a city street by creating a MIDI script that lasts for two minutes and specifies that an ambulance sound should commence one minute into the script and play for thirty seconds.

There is an unfulfilled need for tools to create entire sonic environments.

SUMMARY OF THE INVENTION

A sonic environment is a collection of spatially located sounds describing some scenario. A representation of a sonic environment should have a compact representation. A sonic environment should exhibit well-defined stochastic behavior, and should be temporally unbounded. The sonic environment behavior should be dynamically modifiable through intuitive, application defined parameters. Finally it should lend itself to automatic generation.

The present invention, deemed SoundNet, provides a mechanism for modeling sonic environments that exhibit characteristics that are not possible using current techniques. SoundNet provides a mechanism for expressing sound environments based on programmed behavior of sounds as well as stochastically varying behavior.

SoundNet is made up of SoundNets, which are not temporally bounded so that an environment can be generated indefinitely without the need to resort to looping behavior. SoundNets are a compact representation, which is an important feature for network-based applications like the Internet. SoundNets can be dynamically controlled to modify their behavior at runtime based on application-defined criteria. Finally SoundNets can be automatically generated. This creates a slew of new possibilities in sound research.

A SoundNet is a process for synthesizing sonic environments for use in Virtual Environment applications, computer games, Internet web pages, film and television productions. A sonic environment is a collection of spatially located sounds describing some scenario such as a city street for example. SoundNet provides a process for generating such an environment that has the following properties: a compact representation, stochastically correct behavior, dynamically varying behavior along application defined parameters, temporally unbounded and non-repeating, and facilitates automatic generation of the representation.

SoundNets, on the other hand, are behavioral representations. The representation is a model of how sounds generally act in a given environment. A similar example in SoundNet would model a city street by specifying that an ambulance sound occurs on average once a day, usually in the evening. This is a much more powerful representation because it is not time limited, it is non-repeating, it is parameterized and is encapsulates the stochastic properties of the sounds in the environment.

BRIEF DESCRIPTIONS OF THE DRAWINGS

A more complete appreciation of the invention and many of the attendant advantages thereof will become better understood when referring to the accompanying drawings wherein.

DETAILED DESCRIPTION OF THE INVENTION

SoundNet represents a sonic environment as a network of interconnected nodes. Sonic environments may be created by using synthetic sounds. The behavior of the sonic environment is driven by tokens that propagate through the network. A network node becomes active once it is visited by a token. Once active, a node performs a certain function and may or may not propagate the token forward. The preferred network is a high level petri network, a technique used for modeling complex concurrent systems.

SoundNet defines a set of standard nodes required for generating sonic environments. Nodes are parameterized so that their behavior can exhibit variations based on a random distribution or external parameters such as time of day, time of year, listener location or anything the designer of the environment may want.

Figure 1:
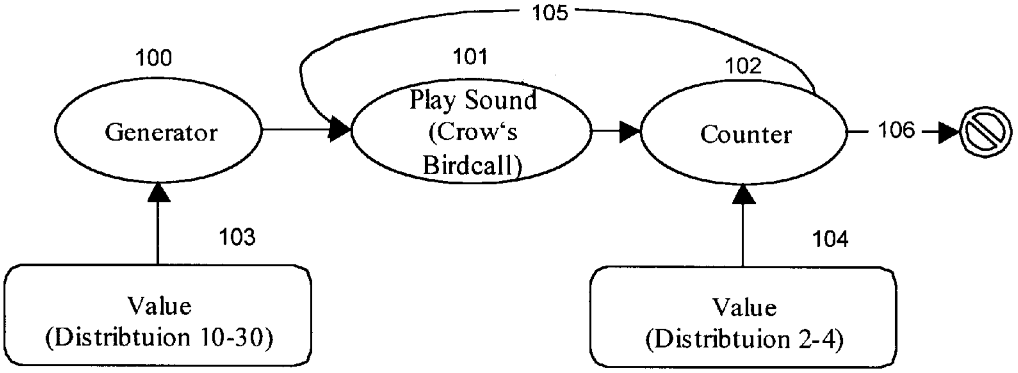
FIG. 1 is an example of the present invention.

FIG. 1 is illustrates the present invention creating a birdcall of a Crow chirping. Generator node 100 produces tokens. Value node 103 specifies the rate at which generator node 100 produces tokens. In this example, value node 103 specifies a rate of 10 to 30 seconds. The actual value returned from value node 103 is based on a random distribution and will be between 10 to 30 seconds.

After generator node 100 receives a value from node 103, generator node 100 then creates a token after the time vale created from value node 103 has elapsed. Generator node 100 then passes a token on to play sound node 101.

The token passed from generator node 100 will cause play sound node 101 to play the birdcall of a Crow and then forward the token to counter node 102.

Value node 104 will create a value between 2 and 4 and pass it to counter node 102. Counter node 102 receives the token from play sound 101. Counter node 102 will decrement the value received from value node 104 and if the value is non-zero then counter node 102 will pass the token through edge 105 to play sound node 101 to repeat the process. When counter 102 becomes zero, the token will follow edge 106 and the token will expire.

The process will continue with the value of counter node 102 being reset to a value between 2 and 4 based on the random distribution returned by value node 104. This simple soundnet will produce a succession of 2 to 4 Crow's birdcalls every 10 to 30 seconds.

A listener attending to the sound produced by the SoundNet in FIG. 1 will observe a Crow's birdcall occurring at random times and with random durations. The birdcall will not appear to be repeating as would be the case with a digital recording of the sound because of the randomness of the occurrence rate and duration of the call. A soundnet birdcall will sound natural because the randomness introduced will exhibit correct statistical behavior of a Crow's birdcall heard in nature.

Figure 2:
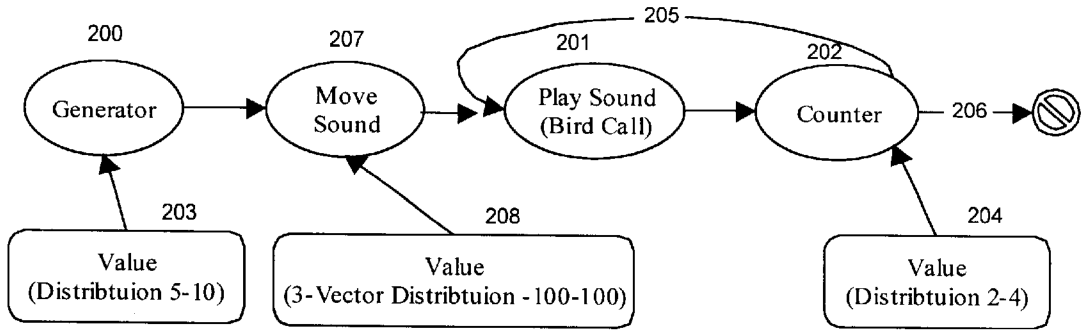
FIG. 2 is a refinement of the present invention in FIG. 1.

The SoundNet in FIG. 1 may easily be modified to better simulate bird sounds in nature by providing the listener with the impression of a number of birds in varying locations, as shown in FIG. 2.

FIG. 2 is a refinement of the present invention in FIG. 1. The SoundNet in FIG. 1 was modified by adding move sound node 207, value node 208, and modifying value node 203.

The operation of the SoundNet in FIG. 2 is as follows. Generator node 200 produces tokens at a rate of one every 5 to 10 seconds based on a random distribution returned by value node 203. A generated token will activate move sound node 207. Move sound node 207 will modify the location of the sound played by play sound node 201. The location of the sound played by play sound node 201 will be determined by value node 208.

Value node 208 provides a three-component vector of random values based on the distribution in value node 208. Move sound node 207 will forward the token to play sound node 201. Play sound node 201 will play the sound of a birdcall at the specified location and then forward the token to counter node 202.

Counter node 202 receives a counter value from value node 204 which will be between 2 and 4 in this example. Counter node 202 will then decrement the counter and, if non-zero, will output the token through edge 205 returning it to play sound node 201. When counter node 202 becomes zero, the token will follow edge 206 and expire.

Once the token expires, counter node 202 will then be reset with a value between 2 and 4 based on the random distribution returned by value node 204. This soundnet, with variables used in this example, will produce a succession of 2 to 4 bird calls every 5 to 10 seconds at a location within a space which is bounded in x, y and z by −100 and 100 created by value node 208.

A listener attending to the sound produced by the SoundNet in FIG. 2 will observe birdcalls in a more rapid succession than that exhibited by the SoundNet in FIG. 1. In FIG. 2 the bird calls will occur in varying locations so that the listener will perceive the calls as coming from different birds at varying locations inside the sound field. In a natural environment, the listener would normally hear a variety of birdcalls corresponding to the different species of birds present in the environment.

Figure 3:
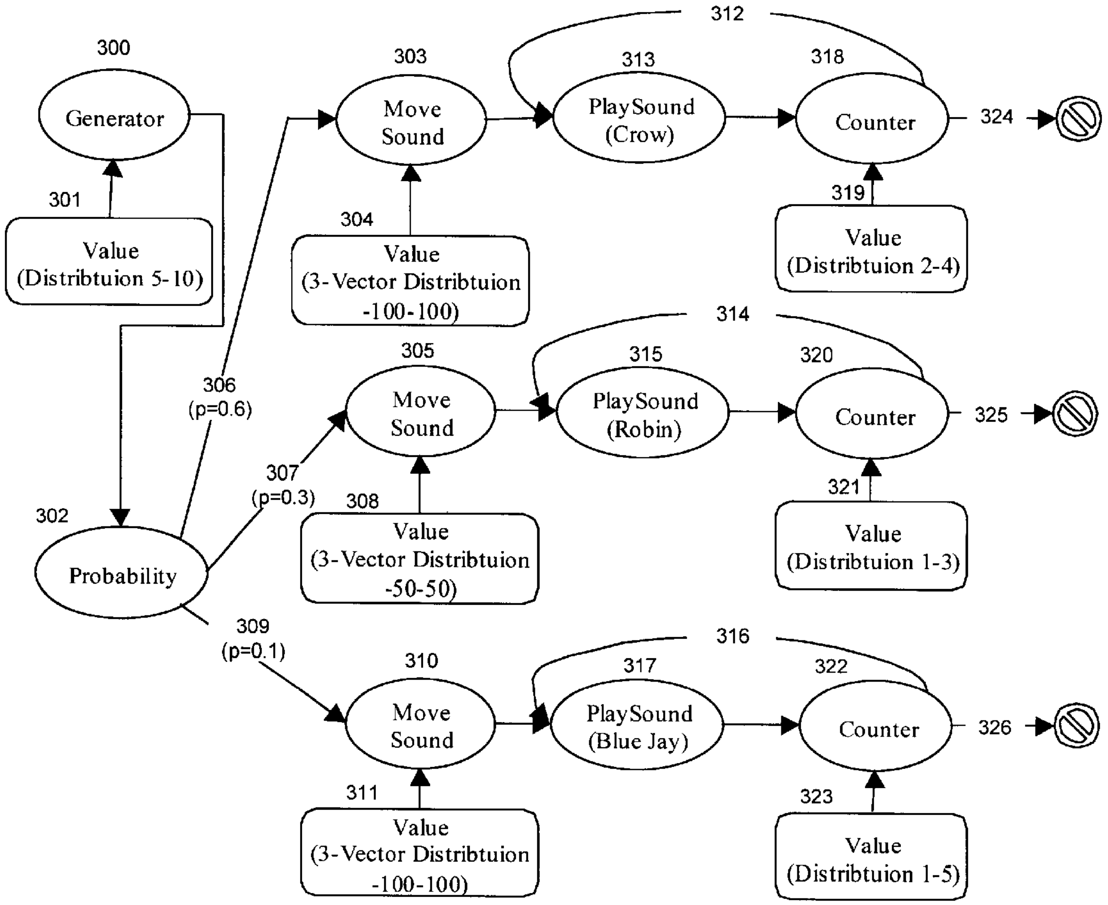
FIG. 3 is a further refinement of the present invention in FIG. 1 and FIG. 2.

The soundnet in FIG. 2 may be modified to create multiple birdcalls. FIG. 3 is a further refinement of the present invention shown in FIG. 1 and FIG. 2, and the SoundNet in FIG. 3 includes three separate paths in the process, each path in the process activates a different birdcall.

Generator node 300 starts the process by generating a token at a rate of one every 5 to 10 seconds depending on the value returned by value node 301. A token is generated by generator node 300 and the token is propagated to probability node 302.

Probability node 302 receives the token from node generator 300 and passes the token to either move sound node 303, move sound node 305, or move sound node 310, depending on the probability assigned to each of the nodes.

In this example move sound node 303 has an associated probability value of 0.6 shown by edge 306. Move sound node 205 has a probability of 0.3 shown by edge 307, and move sound node 310 has a probability of 0.1 as shown by edge 309. Therefore, on average 6 out of every 10 incoming tokens will be propagated by probability node 302 to move sound node 303. Three out of each 10 tokens will be propagated to move sound node 305, and 1 out of every 10 tokens will be propagated to move sound node 310.

The process of the soundnet past probability node 302 is similar to the process in FIG. 2. Play sound nodes 313, 315 and 317 play the birdcalls of a Crow, a Robin and a Blue Jay, respectively. Value nodes 319, 321 and 323 return different value ranges based on the expected behavior of the birdcall of the three bird species, Crow, Robin, and Blue Jay, being played.

Value node 319 will return a distribution value between 2 and 4 for counter node 318. Value node 321 will return a distribution value between 1 and 3 for counter node 320. Value node 323 will return a distribution value between 1 and 5 for counter node 322.

Counter node 318 will decrement the distribution value and continue to pass the token to play sound node 313 as long as the distribution value is non-zero. Once the distribution value is zero, counter node 318 will pass the token on to expire 324.

Counter node 320 will decrement the distribution value and continue to pass the token to play sound node 315 as long as the distribution value is non-zero. Once the distribution value is zero, counter node 320 will pass the token on to expire 325.

Counter node 322 will decrement the distribution value and continue to pass the token to play sound node 317 as long as the distribution value is non-zero. Once the distribution value is zero, counter node 322 will pass the token on to expire 326.

A listener attending to the sound produced by the SoundNet in FIG. 3 will observe three different birdcalls at varying intervals, locations, and rates of occurrence. The listener will hear a predominance of Crows, some Robins, and less frequently, Blue Jays, based on the probabilities associated with probability node 302. The pattern of birdcalls will sound natural and will not appear to be repeating. Furthermore the sound produced by this SoundNet may be played indefinitely without repetition so that the environment will sound natural for as long as deemed necessary by the application.

Producing a similar sonic environment utilizing a digital recording or sequencing scheme would not be possible since at some point, looping would be necessary because the representations are temporally bounded.

The previous example can be further refined to include other animal calls found in the forest as well as natural sounds such as wind. The time of day and year could be taken into account so that a selection of sound is played which is appropriate for that time of day and year.

The following are explanations of the present invention nodes comprising components of the soundnet network. The novelty of the SoundNet technique is its use of High Level Petri nets to represent sonic environments, and its definition of appropriate nodes. The following is a description of the constituent elements comprising a SoundNet network.

Value Nodes

The prototype node in SoundNet encompasses a behavior and a set of portals that can receive values one for each parameter of the node. These values, in turn, affect the behavior of the node. The concept of a generic value node 1is a powerful construct allowing SoundNet to exhibit interesting behavior.

A Value node can be of any type, which may be a constant numeric value, one of many random distributions, a boolean value, an ordered sequence, a date and time, an interpolated value, or an external parameter. Upon evaluation a value node returns a value based on its type.

A constant numeric value node simply returns it's numeric value. A random distribution node returns a numeric value between a user specified minimum and maximum value based on a random distribution. A boolean value node returns true or false based on a logical expression. A date and time node returns the current date and time. An external parameter node returns a numeric value set by the application program. An ordered sequence node returns the next value of a sequence of specified values, upon reaching the last value of the sequence, the sequence is started from the beginning. An interpolated value node returns an interpolated value which can be specified as a linear interpolation, a straight line between two values, or a higher-level interpolation, a spline.

Routing Nodes

Routing nodes control the propagation of a token through the SoundNet network. Routing nodes are essentially the control mechanism used in implementing a behavior for the soundnet. Routing nodes consist of the following nodes: a counter node, a delay node, a probability node, a signal node, a broadcast node, and a gate node.

Figure 4:
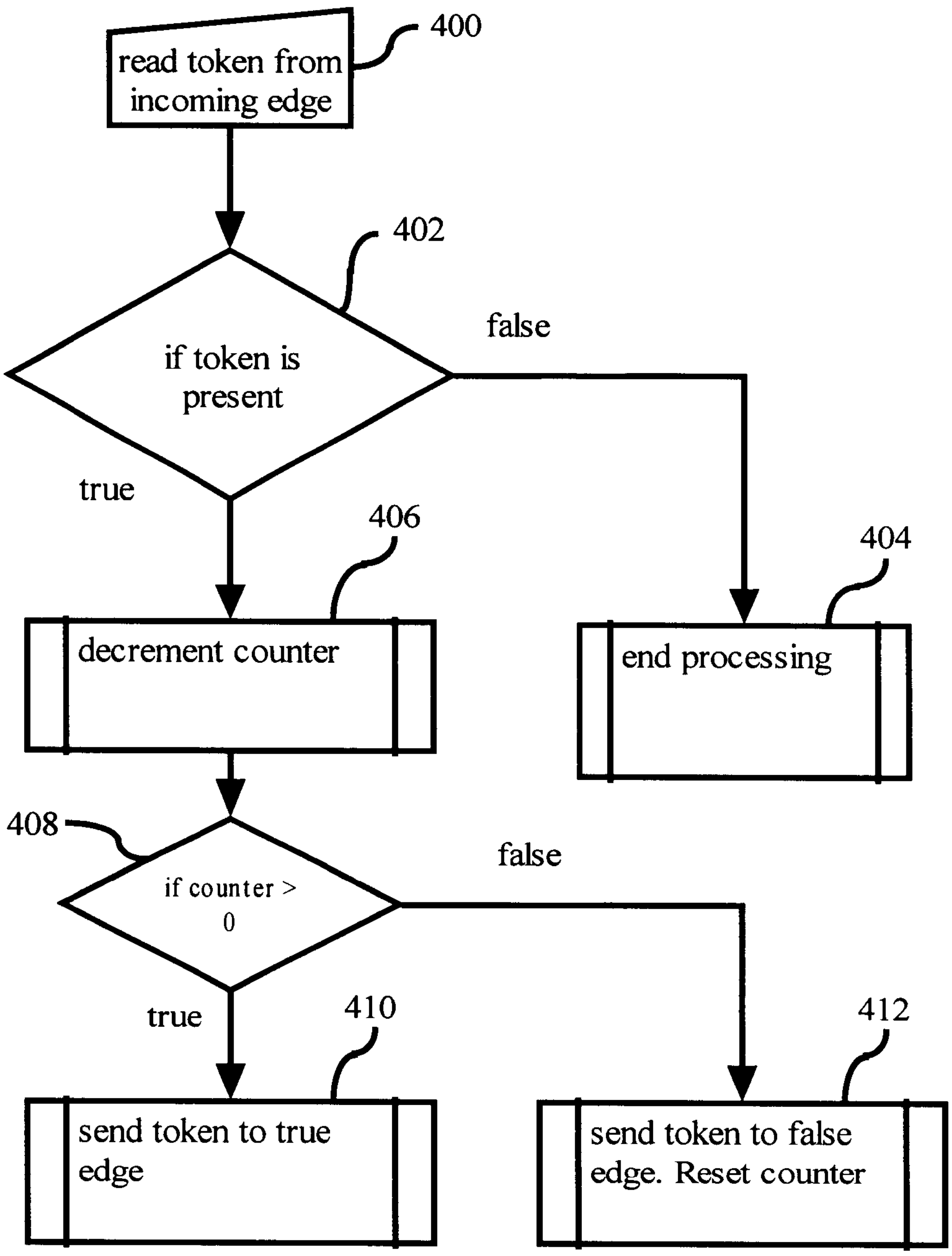
FIG. 4 is a flowchart of the present invention Counter node.

FIG. 4 is a flowchart of the present invention Counter node. A Counter node decrements an internal counter and propagates a token to one of its two outputs based on the value of the counter.

The process starts at step 400, which receives the incoming token. Decision step 402 then determines if a token has been received. If a token is not present then step 404 end the process for this node. If a token is present then step 406 decrements the counter value. Decision step 408 then determines if the counter value is zero or non-zero. Step 410 receives the token if the counter value is non-zero and passes the token to the node connected to the "true" edge of the node. Step 412 receives the token if the counter value is zero and passes the token to the "false" edge of the node.

Figure 5:
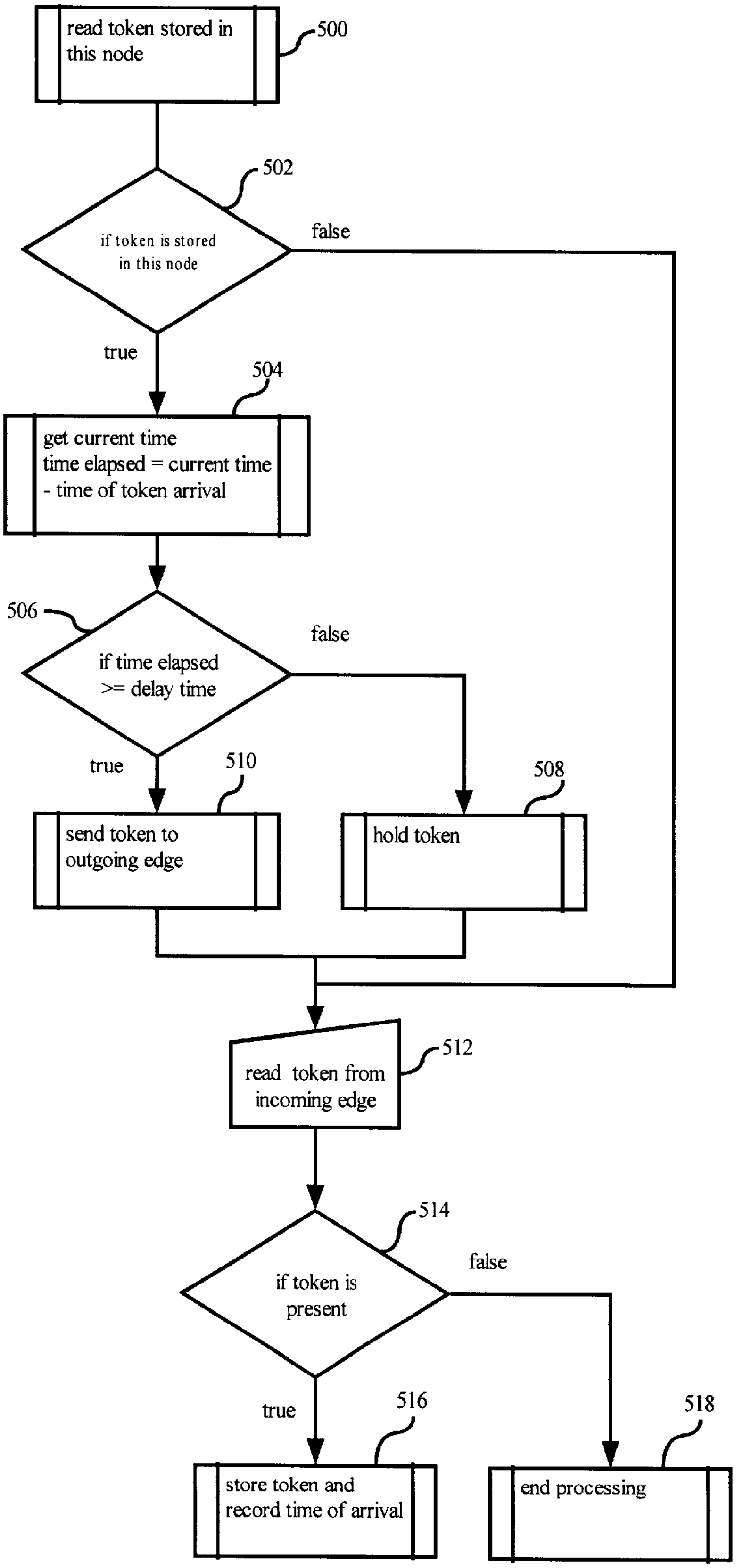
FIG. 5 is a flowchart of the present invention Delay node.

FIG. 5 is a flowchart of the present invention delay node. A delay node holds an incoming token for a specified amount of time before propagating it to its output. Step 500 reads a token that was previously stored in this node. Decision step 502 determines if a token is present and if so passes the process to step 504, if a token has not been received from step 500 then the process passes to step 512.

Step 504 obtains the current time and determines the elapsed time. The elapsed time is determined by subtracting the recorded time of the arrival of the token from the current time. Step 504 then passes the process on to decision step 506.

Decision step 506 determines if the elapsed time is greater then or equal to the delay time, which is the amount of time that the token must be held by this node. If the time elapsed is equal to or greater than the delay time then process step 510 sends the token on to the next node and the process continues to step 512. If the time elapsed is less than the delay time then process step 508 holds the token and the process continues to step 512.

Step 512 receives a token. Decision step 514 receives the token and determines if the a token is present, if a token is present then the process passes on to step 516. If a token is not stored in this node then the process ends for this node in step 518. Step 516 stores the token and records the date the token was received.

Figure 6:
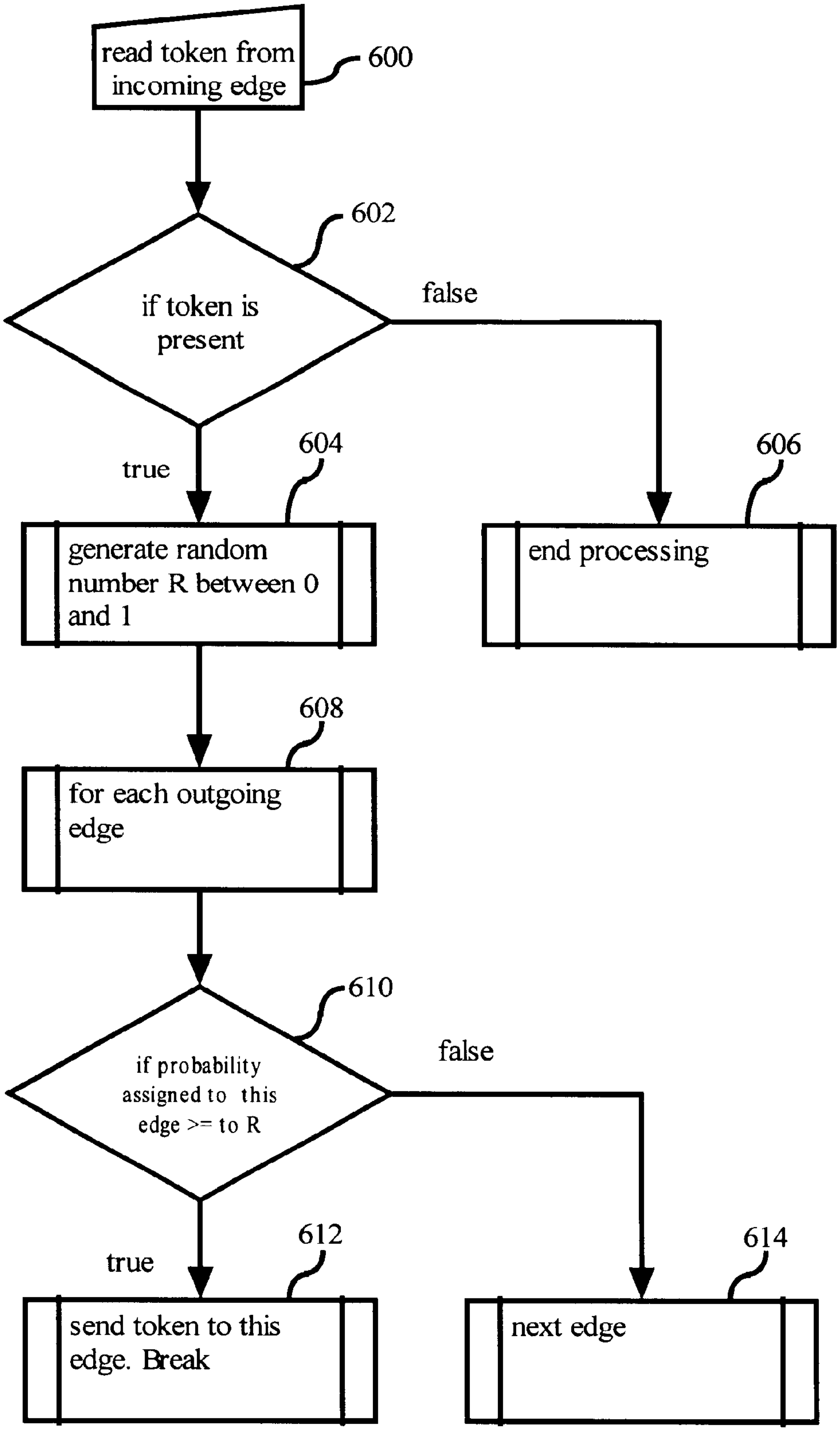
FIG. 6 is a flowchart of the present invention Probability node.

FIG. 6 is a flowchart of the present invention probability node. A probability node propagates an input token to one of its outputs based on the probabilities assigned to each output connected to the node.

Step 600 receives a token. Decision step 602 determines if a token is present. If a token is present in decision step 602 then the process is passed on to step 604. If a token is not present in decision step 602 then the process ends for this node in step 606.

Step 604 then generates a random number between zero and one and passes the process onto step 608. For each output the process passes on to step 610 to determine if the probability assigned to the output being evaluated is greater then or equal to the random number, if true then the process passes on to step 612 to send the token to the node associated with the output. If false, then the process passes back to step 608 to evaluate the next output.

Figure 7:
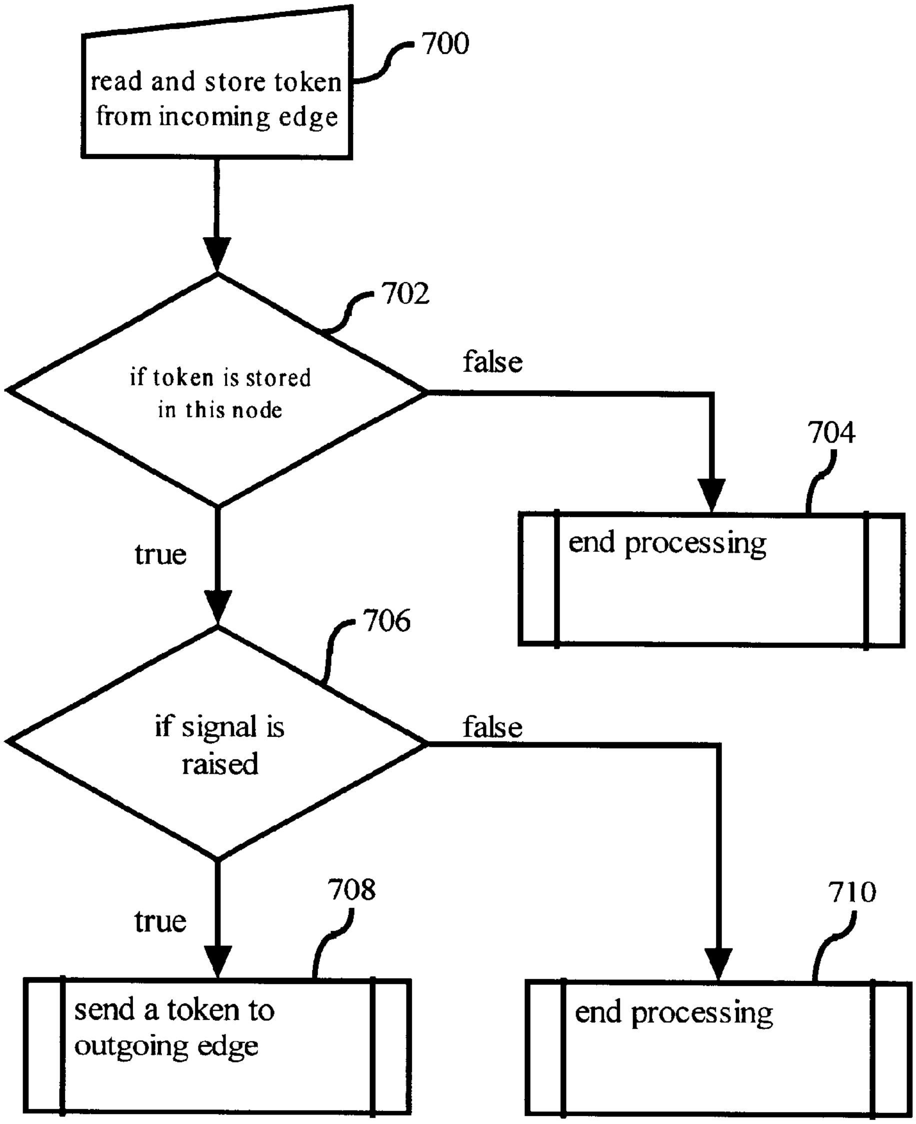
FIG. 7 is a flowchart of the present invention Signal node.

FIG. 7 is a flowchart of the present invention Signal node. A Signal node holds an input token until it has received a signal to release the token. The process starts with step 700, which receives a token, stores it in the node and passes the process on to step 702. Decision step 702 determines if a token is stored in this node. If a token is stored in this node then decision step 702 passes the process on to decision step 706. If a token is not stored in this node then decision step 702 passes the process on to step 704 which ends processing for this node.

Decision step 706 passes the process on to step 708 if a signal is raised to release the token. A signal is raised by a process external to the SoundNet such as a user application. Step 708 then passes the token to an output. Decision step 706 passes the process on to step 710 if a signal is not raised to release the token. Step 710 ends processing for this node.

Figure 8:
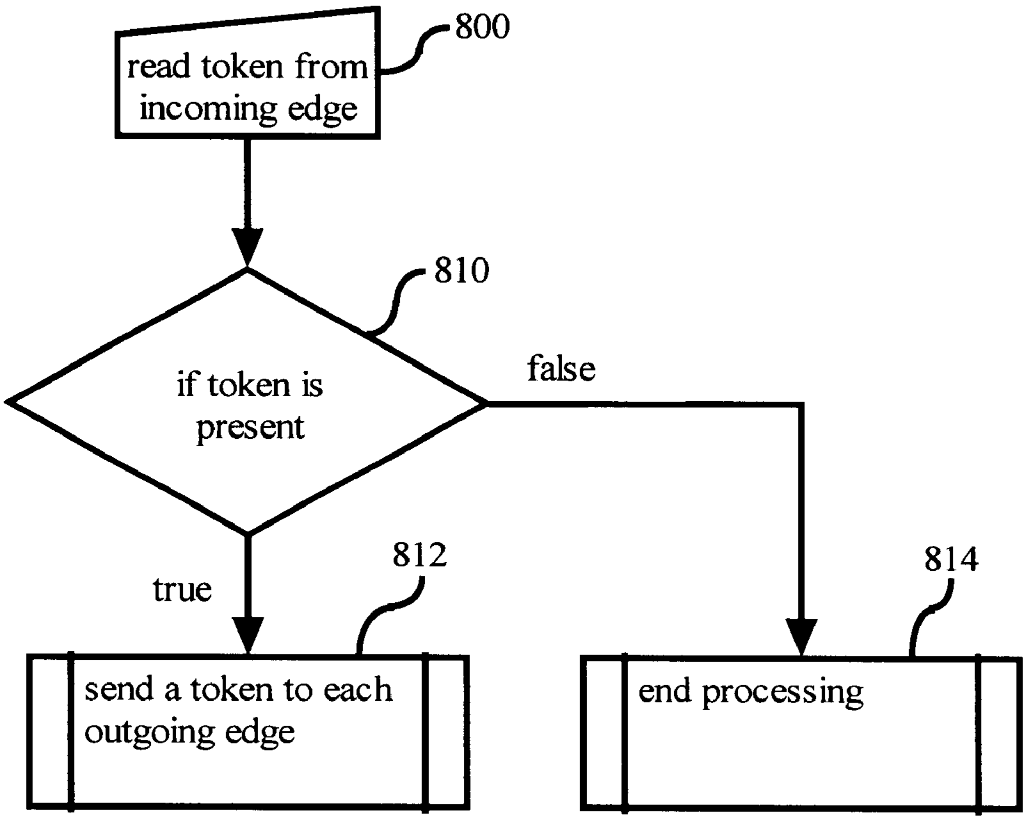
FIG. 8 is a flowchart of the present invention Broadcast node.

FIG. 8 is a flowchart of the present invention broadcast node. A broadcast node generates one token for each output connected to the broadcast node upon receiving a token. The process starts at step 800. Step 800 then passes the process on to decision step 810. Decision step 810 then passes the process on to step 812 if a token is present. Decision step 810 passes the process on to step 814 if a token is not present.

Step 812 passes the token to each output of the broadcast node. Step 814 ends the process for this node.

Figure 9:
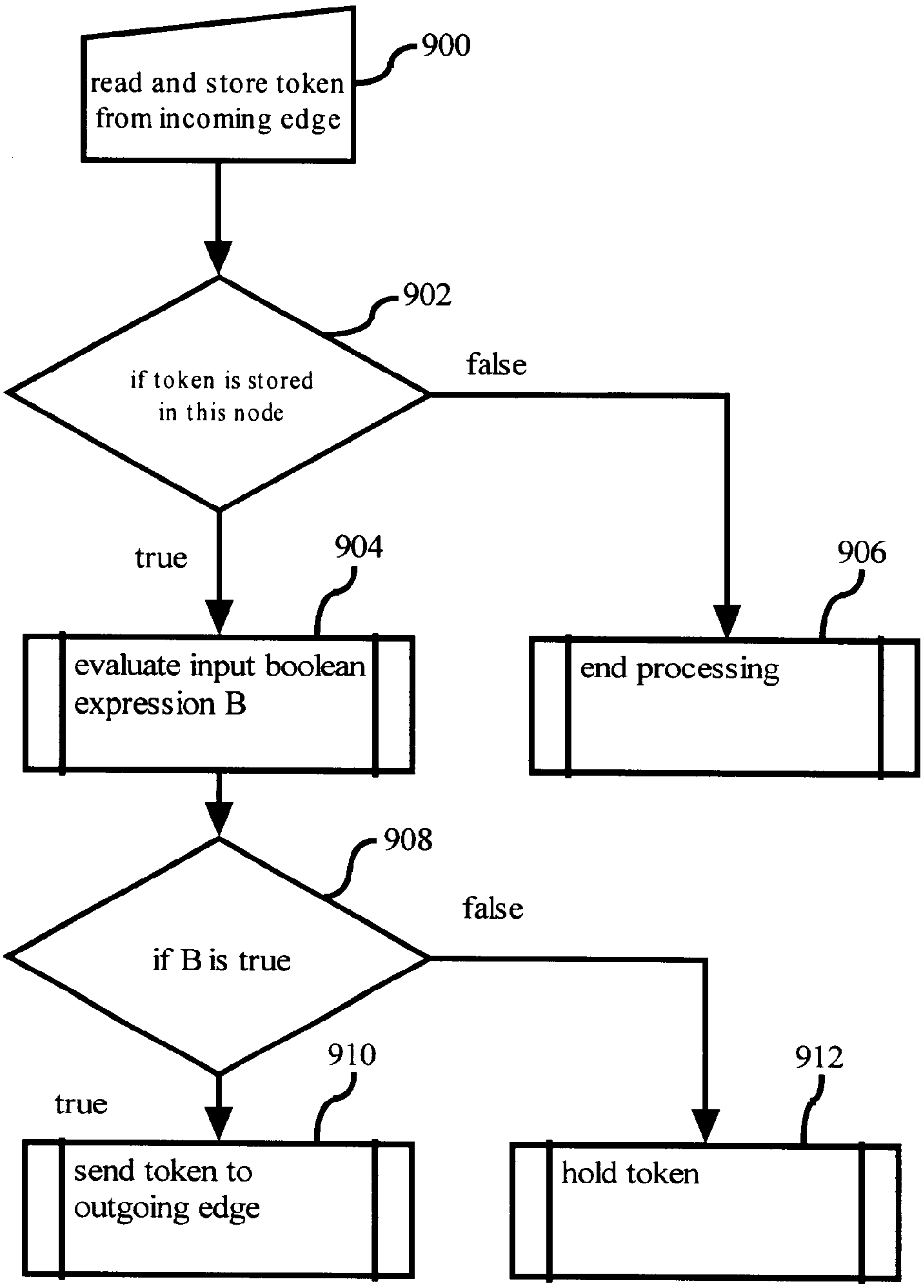
FIG. 9 is a flowchart of the present invention Gate node.

FIG. 9 is a flowchart of the present invention gate node. A Gate node propagates a token while its boolean input evaluates to true. The process starts at step 900 to receive a token. Step 900 then passes the process to step 904 if a token is stored in this node. Step 902 passes the process on to step 906 if a token is not stored in this node. Step 906 ends the process for this node.

Process step 904 then evaluates input boolean expression B and decision step 908 passes the process on to step 910 if boolean expression B is true, or passes the process on to step 912 if boolean expression B is false. Step 910 passes the token to the output. Step 912 holds the token in this node.

Sound Control Nodes

Sound control nodes control the behavior of sound by starting, stopping and modifying sounds. They utilize a 3D audio subsystem for playing, modifying, and positioning sounds. Sound control nodes consist of the following: a PlaySound node, a PlayScript node, a ModifySound node, and a MoveSound node.

Figure 10:
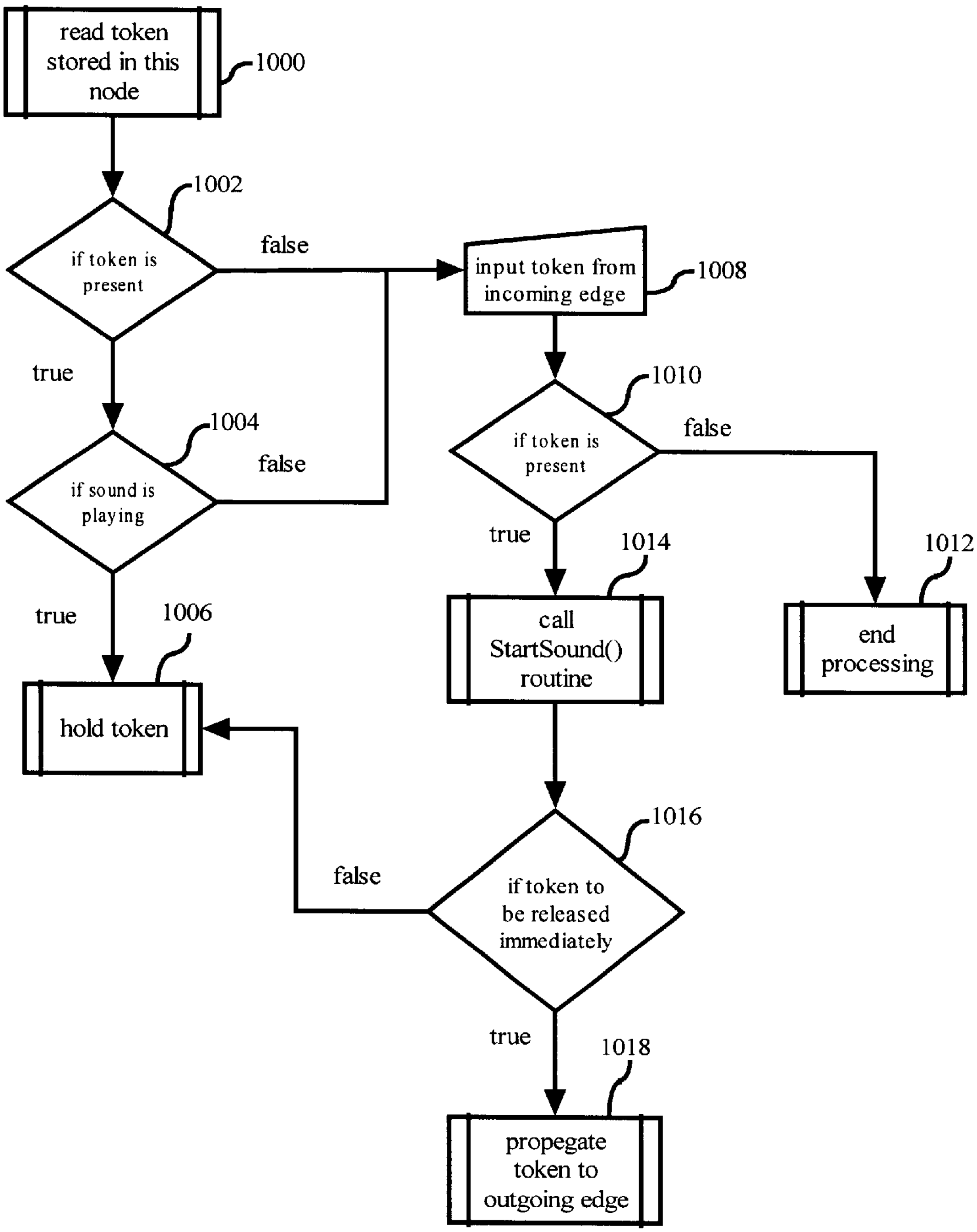
FIG. 10 is a flowchart of the present invention PlaySound node.

FIG. 10 is a flowchart of the present invention PlaySound node. A PlaySound node commences the playback of a sound upon receiving a token. The token can be released immediately or after the playback has been completed depending on the characteristics of the node. Step 1000 begins the process of the PlaySound node by reading the token previously stored in the node. Step 1000 then passes the process to step 1002. Step 1002 determines if a token is present and if so passes the process to step 1004, otherwise it passes the process to step 1008. Step 1004 determines if a sound is currently playing and if so passes the process to step 1006 otherwise it passes the process to step 1008. Step 1006 holds the token at this node. Step 1008 receives a token and passes the process on to step 1010. Step 1010 then passes the process on to step 1014 if a token is present or passes the process on to step 1012 if a token is not present. Step 1012 ends the process for this node.

Step 1014 makes a function call to start the sound and passes the process on to decision step 1016. Decision step 1016 passes the process on to step 1018 if the token is to be released immediately. Step 1018 then passes the token to the output.

Decision step 1016 passes the token to step 1006 if the token is not to be released immediately. Step 1006 holds the token at this node.

Figure 11:
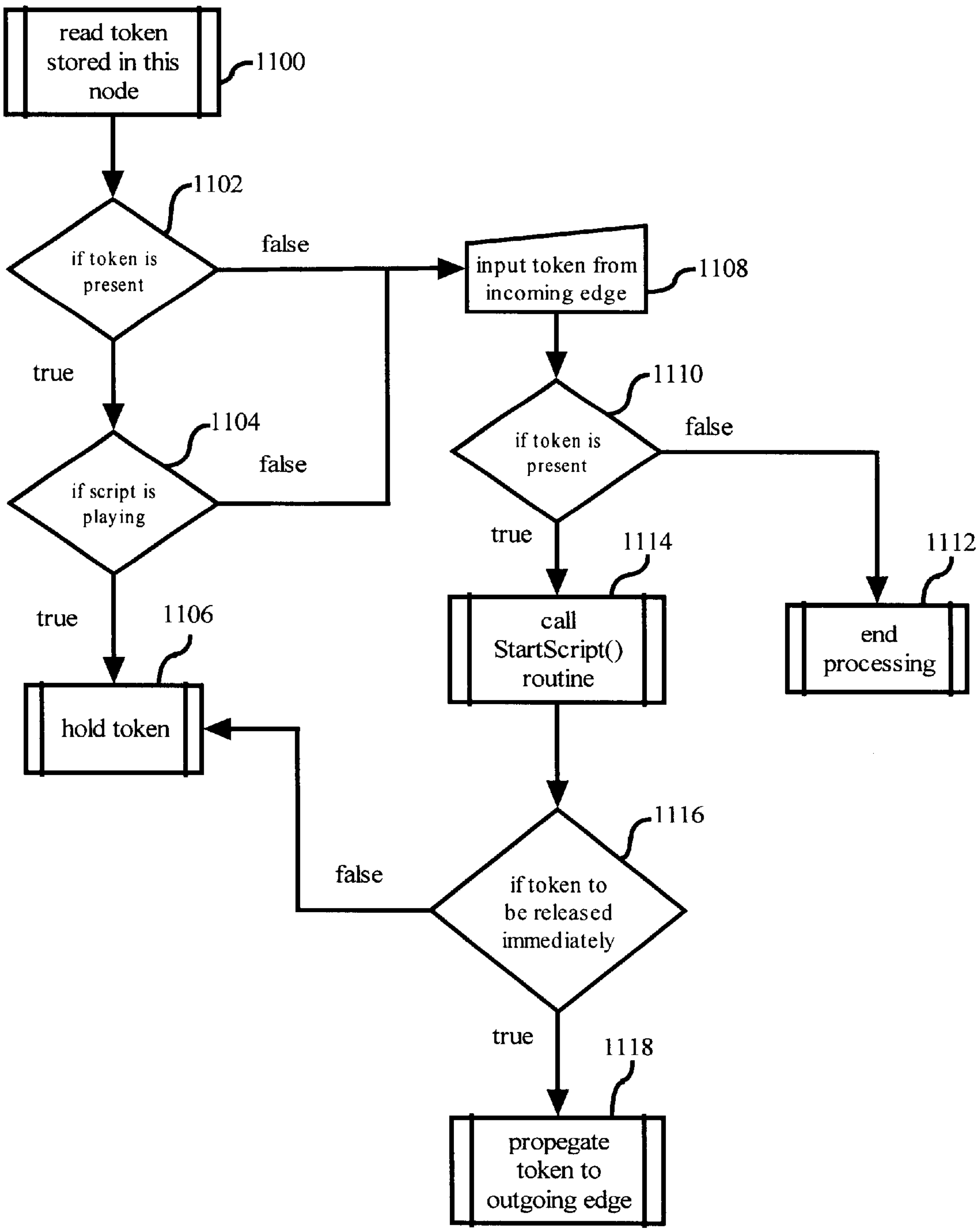
FIG. 11 is a flowchart of the present invention PlayScript node.

FIG. 11 is a flowchart of the present invention PlayScript node. A PlayScript node commences the playback of a sound script upon receiving a token. A script is a set of time-stamped events for starting, stopping and modifying sounds. The process starts at step 1100 which reads the token previously stored in the node. Step 1100 then passes the process to step 1102. Step 1102 which determines if a token is present and if so passes the process to step 1104, otherwise it passes the process to step 1108. Step 1104 determines if a sound is currently playing and if so passes the process to step 1106 otherwise it passes the process to step 1108. Step 1106 holds the token at this node. Step 1108 receives a token and passes the process on to decision step 1110. Decision step 1110 passes the process on to step 1114 if a token is present, or onto step 1112 if a token is not present. Step 1112 ends the process for this node.

Step 1114 calls a function to start the script routine to play the sound and then passes the process on to decision step 1116. Decision step 1116 then passes the process on to step 1118 which passes the token to the output, if the token is to be released immediately. If the token is not to be released immediately then decision step 1116 passes the process on to step 1106 which holds the token at this node.

Step 1112 passes the process on to step 1116 to hold the token if the script is playing. If the script is not playing then decision step 1112 passes the process on to step 1114 to pass the token to the output.

Figure 12:
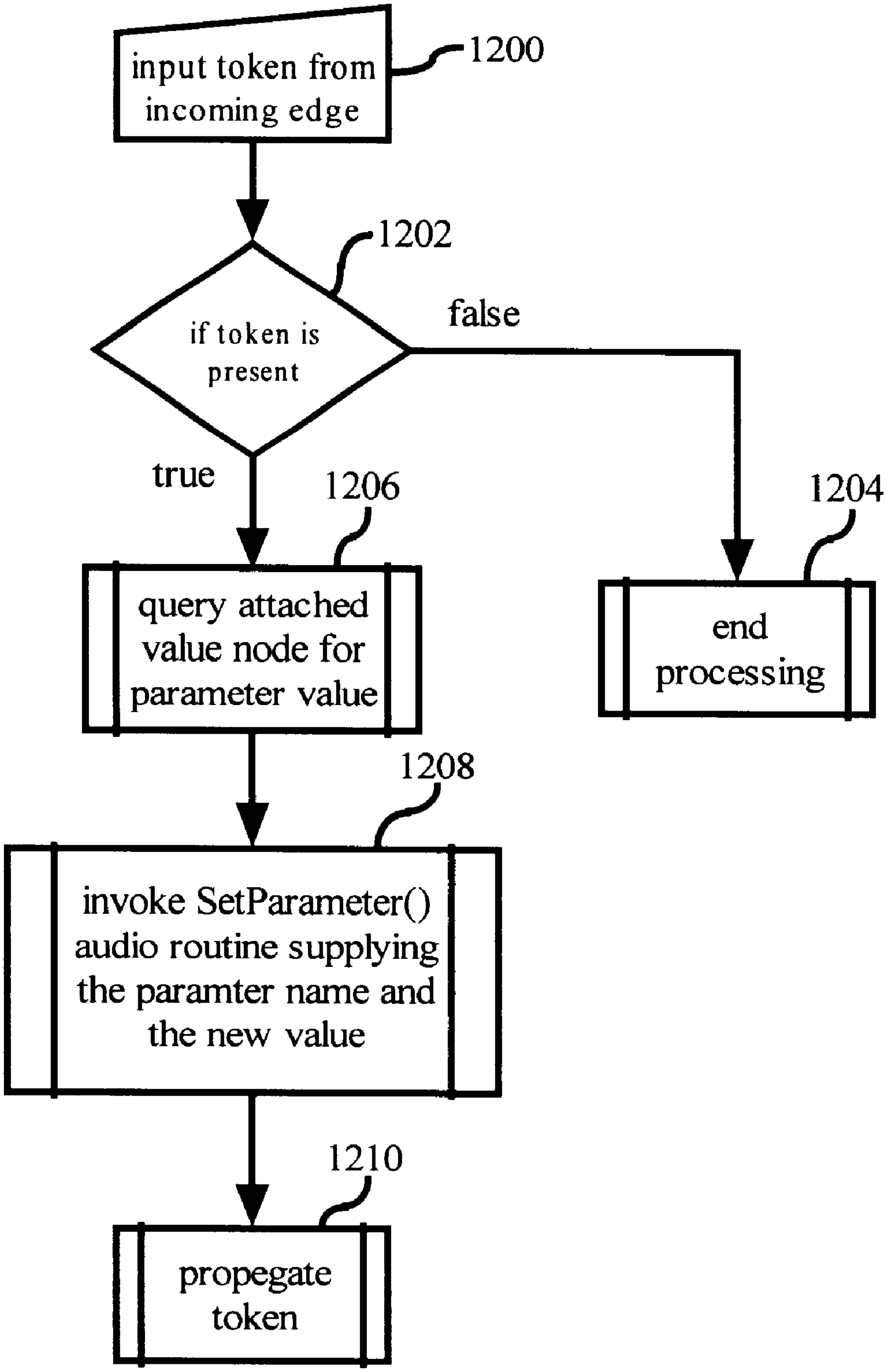
FIG. 12 is a flowchart of the present invention Modify-Sound node.

FIG. 12 is a flowchart of the present invention Modify-Sound node. A ModifySound node modifies a predetermined parameter value associated with a sound. Sound parameters control the sonic quality of a playing sound such as the volume, pitch, modulation etc. The ModifySound node is associated with a specific sound source and parameter value. The parameter value is determined by a Value node attached to the ModifySound node.

The process of the ModifySound node starts with step 1200 which receives a node and passes the process on to decision step 1202 to determine if a token is present. If a token is not present then decision step 1202 passes the process on to step 1204 which ends the processing for this node.

Decision step 1202 passes the token on to step 1206 if a token is present. Step 1206 queries value node attached to the ModifySound node for a parameter value and then passes the process on to step 1208. Step 1208 then starts a audio routine, SetParameter, which supplies the parameter name and the new value. Step 1208 then passes to step 1210. Step 1210 then passes the process to the output.

Figure 13:
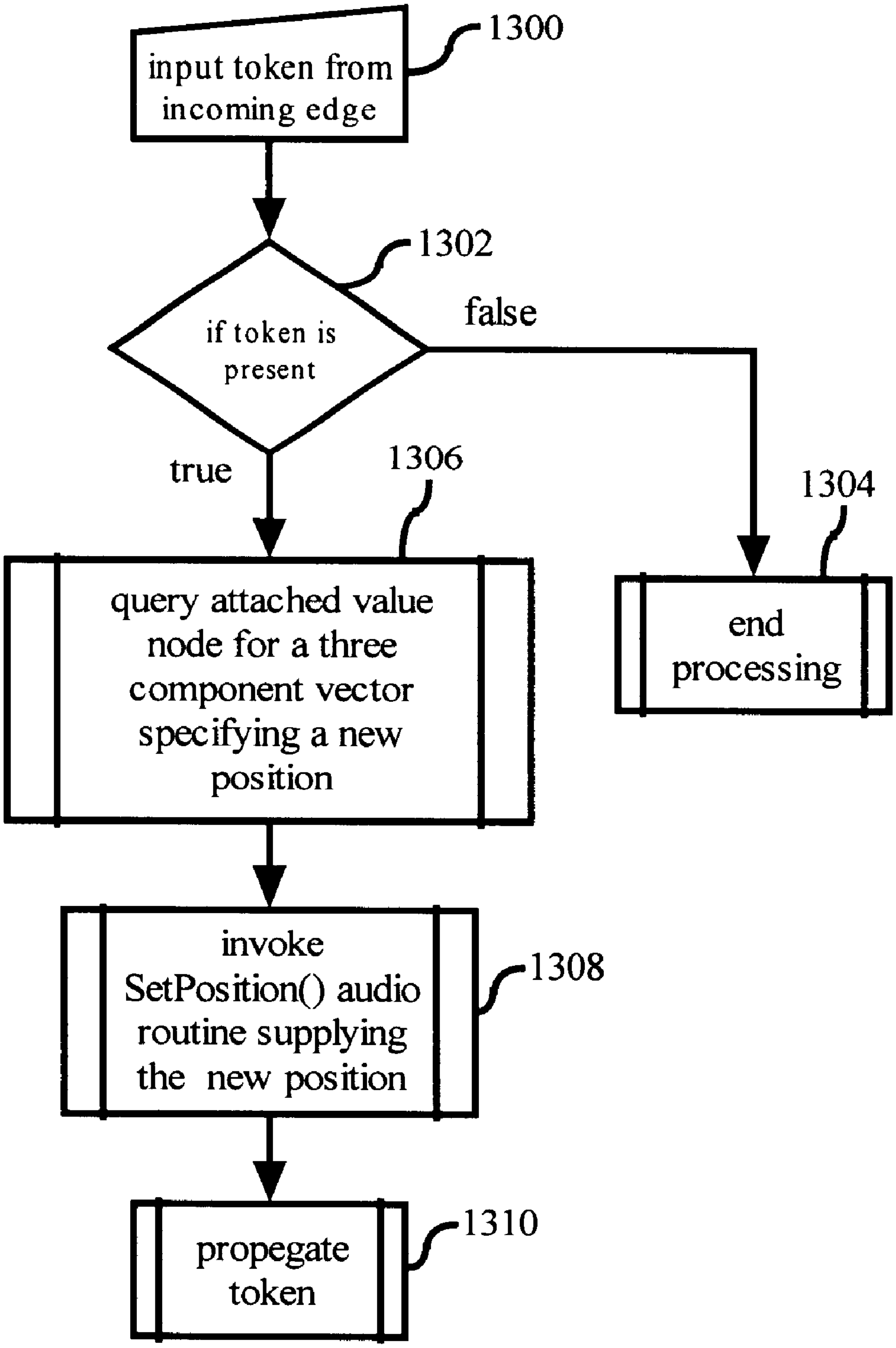
FIG. 13 is a flowchart of the present invention Move-Sound node.

FIG. 13 is a flowchart of the present invention MoveSound node. A MoveSound node moves a sound to a location in three dimensional, 3D, space based on the value of three input parameters to the node. The process starts with step 1300 receiving a token and passing the process on to decision step 1302. Step 1302 then passes the process on to step 1306 if a token is present. If a token is not present then step 1302 passes the process on to step 1304. Step 1304 ends processing for this node.

Step 1306 queries value attached to the MoveSound node for a three component vector specifying a new position and then passes the process on to step 1308. Step 1308 invokes an audio routine, SetPosition, supplying the new position. Step 1308 then passes the process on to step 1310 which passes the token to the output.

The Network Node

The Network node is the top-level node in any SoundNet. A Network node provides access to the Soundnet network and controls its execution. The traversal of tokens in the SoundNet occurs synchronously at regular intervals. The Network node utilizes a clock signal to update the network at a specified rate. Upon each clock signal, the Network node traverses all the outputs in the SoundNet and calls each output's Update routine. This routine checks for tokens arriving at the input and upon arrival delivers the token to its output node. The Output node also checks the token for expiration. Users of the SoundNet network control the execution of the network through the Network node.

Figure 14:
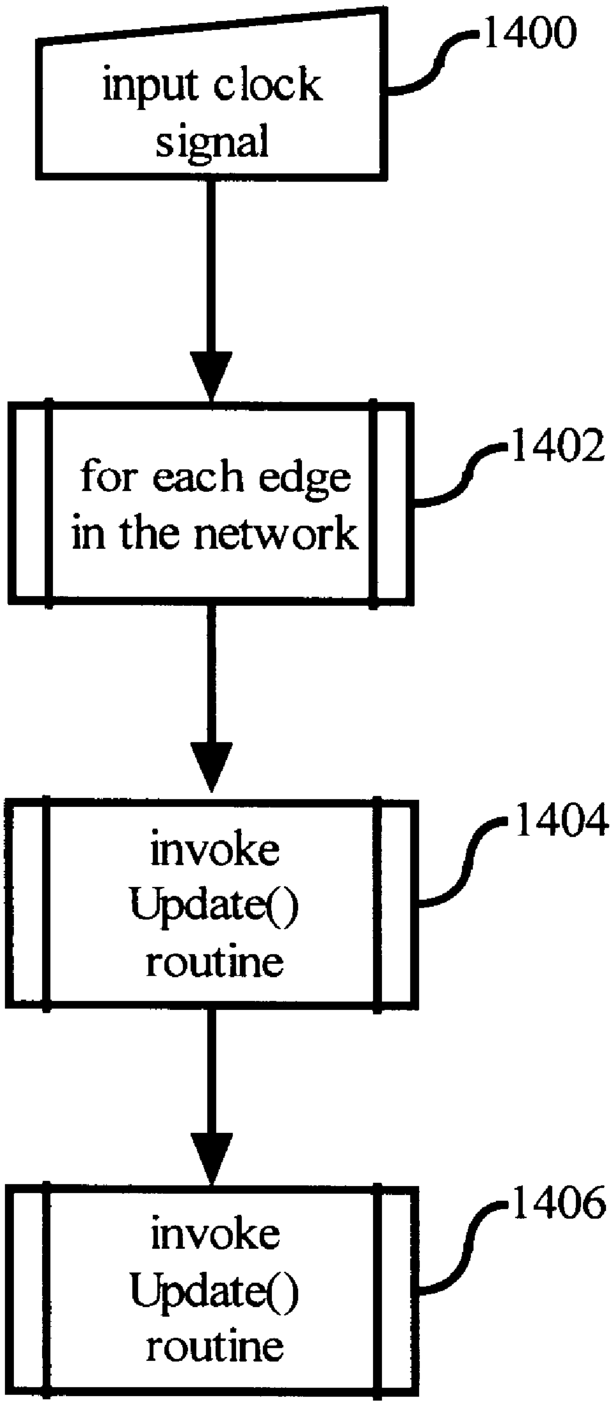
FIG. 14 is a flowchart of the present invention Network node.

FIG. 14 is a flowchart of the present invention Network node. The process starts at step 1400 where an input clock signal is received. Step 1400 passes the process on to step 1402 which determines each output in the network and passes the process on to step 1404 for each output in the network. Step 1404 then invokes a routine to update each token, Update routine.

The Generator Node

The Generator node is an essential component of SoundNet because it is responsible for introducing tokens into the network. Tokens are generated by this node at a rate that is determined by an input Value node.

Figure 15:
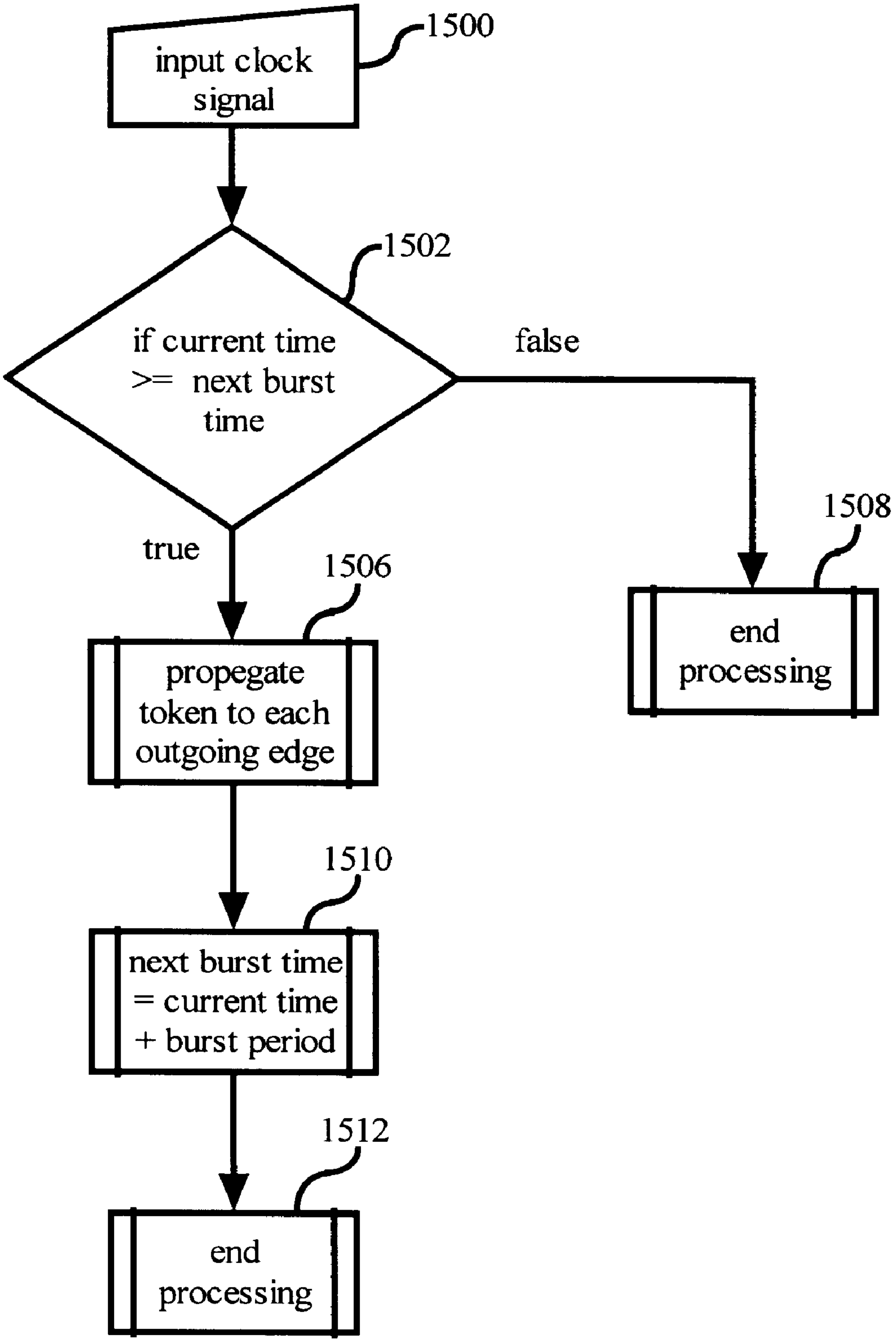
FIG. 15 is a flowchart of the present invention Generator node.

FIG. 15 is a flowchart of the present invention Generator node. The process begins with step 1500 which receives an input clock signal and passes the process on to decision step 1502. Decision step 1502 passes the process on to step 1506 if the current time is greater then or equal to the next burst time which is the time for the next scheduled token generation. If the current time is not greater then or equal to the next burst time then step 1502 passes the process on to step 1508. Step 1508 then ends processing for this node.

Step 1506 passes a token to each output and then passes the process on to step 1510. Step 1510 then determines the next burst time by adding the current time and the burst periods. Step 1510 the processing ends.

Edges

Edges, outputs, connect SoundNet nodes to form a network. An Edge has a single property that is a probability value associated with the edge. The probability value is used by the Probability routing node in distributing a token to one of its outgoing edges.

Tokens

Tokens are the execution mechanism in SoundNet. Nodes are activated upon the receipt of a token. Tokens have a single property that is their lifetime. A token will propagate through the network until its lifetime has expired. This enables the application to specify a length of time for a behavior to occur.

Generating SoundNets

SoundNets may be generated manually by programmatically instantiating nodes and connecting them using edges. Interactive editing software can greatly expedite the process by allowing users to interactively create, modify and connect nodes to form a SoundNet while viewing a graphical representation of the network.

A natural extension that is possible given this representation of a sonic environment is the automatic generation of SoundNets. One possible technique is to use an existing recording of an environment and extract an equivalent SoundNet representation by performing stream segregation and statistical analysis on the component sounds in the recording. Another possible approach is to use Genetic Algorithms to "grow" SoundNets based on some fitness criteria provided by the user. Both techniques are currently under investigation.

As shown by the present invention, sound modifying nodes include but are not limited to play sound, play script, move sound, and modify sound.

As shown by the present invention, traversal nodes include but are not limited to counter , delay, probability, signal, broadcast, gate, generator, and network.

An intended use of SoundNet is to produce ambient sounds for augmenting architectural spaces. Possible spaces include but are not limited to: museums, public buildings, private offices, resturants, and private residences.

Obviously, numerous modifications and variations of the present invention are possible in light of the above teachings. It is therefore to be understood that within the scope of the appended claims, the invention may be practiced otherwise than specifically described herein.

What is claimed is:

1. A method for modeling sonic environments, said method comprising:

producing at random, a plurality of tokens, determining a number of tokens which are included in said plurality of tokens, passing said plurality of tokens to a sound generator, producing a sound in said sound generator a specified number of times, and said specified number of times equals said number of tokens.

2. The method for modeling sonic environments, as claimed in claim 1, wherein said method further comprises repeating said number of times said sound is produced depending on a value supplied by a value node.

3. The method for modeling sonic environments, as claimed in claim 2, wherein said value supplied by said value node is sent to a counter, and said counter determines whether the value is greater than zero, if said value is greater than zero, said counter instructs said sound generator to repeat said specified number of times, if said value is zero, said counter instructs said sound generator to stop repeating said sounds.

4. The method for modeling sonic environments, as claimed in claim 1, wherein said method further comprises adding a move node to modify the location of said sounds.

5. The method for modeling sonic environments, as claimed in claim 4, wherein said move node is controlled by a vector distribution node, said vector distribution node provides three component vector values to said move node.

6. The method for modeling sonic environments, as claimed in claim 5, wherein said three component vector values are chosen at random.

7. The method for modeling sonic environments, as claimed in claim 1, wherein said method further comprises making said sound generator produce a plurality of sounds, and each of said plurality of sounds is different from one another.

8. The method for modeling sonic environments, as claimed in claim 7, wherein each of said plurality of sounds is produced by a different sound generator.

9. The method for modeling sonic environments, as claimed in claim 8, wherein said method further comprises adding move nodes to modify the location of each of said plurality of sounds.

10. The method for modeling sonic environments, as claimed in claim 9, wherein each of said move nodes is controlled by a vector distribution node, said vector distribution node provides three component vector values to each of said move nodes.

11. The method for modeling sonic environments, as claimed in claim 10, wherein said three component vector values are chosen at random.

12. The method for modeling sonic environments, as claimed in claim 8, wherein said method further comprises using a probability node, said probability node determines an order in which said move nodes are activated.

* * * * *